(No Model.)
P. DENNAU, Sr.
VEHICLE WHEEL.
No. 427,057. Patented May 6, 1890.
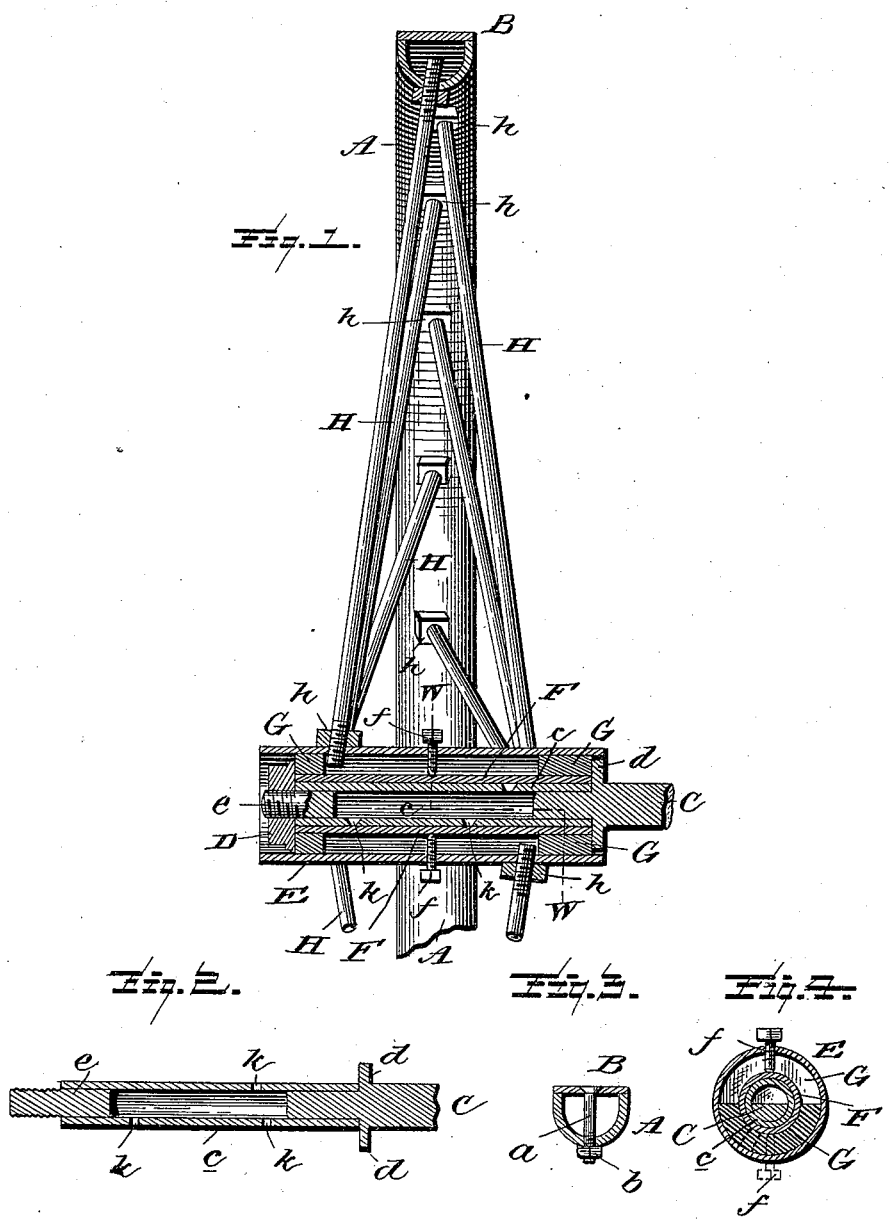
Witnesses
L. C. Hills.
E. H. Bond.
Inventor
Peter Dennau Sr.
per Chas. H. Fowler,
Attorney

UNITED STATES PATENT OFFICE.

PETER DENNAU, SR., OF MONTAGUE, MICHIGAN.

VEHICLE-WHEEL.

SPECIFICATION forming part of Letters Patent No. 427,057, dated May 6, 1890.

Application filed February 7, 1890. Serial No. 339,613. (No model.)

*To all whom it may concern:*

Be it known that I, PETER DENNAU, Sr., a citizen of the United States, residing at Montague, in the county of Muskegon and State of Michigan, have invented certain new and useful Improvements in Vehicle-Wheels; and I do hereby declare that the following is a full, clear, and exact description of the same, reference being had to the annexed drawings, making a part of this specification, and to the letters of reference marked thereon.

This invention relates to certain new and useful improvements in vehicle-wheels; and it has for its object, among others, to provide an improved wheel which shall be light and durable, and which may be readily put together or any broken part replaced by a new one without skilled labor.

Other objects and advantages will hereinafter be made apparent, and the novel features of the invention will be particularly pointed out in the appended claim.

The novelty resides in the peculiar combinations, and the construction, arrangement, and adaptation of parts, all as more fully hereinafter described, shown in the drawings, and then particularly pointed out in the appended claim.

The invention is clearly illustrated in the accompanying drawings, which, with the letters of reference marked thereon, form a part of this specification, and in which—

Figure 1 is a sectional view with parts in side elevation, showing my improved wheel. Fig. 2 is a longitudinal section through the axle-skein. Fig. 3 is a section through the felly and tire. Fig. 4 is a section on the line W W of Fig. 1.

Like letters of reference indicate like parts throughout the several views.

Referring now to the details of the drawings by letter, A designates the felly, which is substantially U-shaped in cross-section, and is provided with a flat tire B, which is secured thereto, as shown in Fig. 3, by means of short bolts $a$, the heads of which are countersunk in the face of the tire and the inner ends provided with nuts $b$, by which they are tightened and the tire held to the felly.

C is the axle, the outer end or skein of which is formed of gas-pipe $c$, to which the solid end of the axle is fitted and welded, being formed with a rim or flange $d$, against which the said gas-pipe abuts, as shown best in Fig. 2. In the end of the gas-pipe, at the outer end, is a solid piece $e$, which is welded or otherwise secured thereto, and is screw-threaded, as shown, to receive the nut D, as shown in Fig. 1.

The hub is formed of two concentric pieces of gas-pipe E and F, the two being held the requisite distance apart by means of the wooden wedges G, driven between them, as shown in Fig. 1.

The axle-skein is fitted within the inner pipe of the hub, as shown in Fig. 1, and the nut D screwed onto the end of the short piece $e$ of the skein and the flange $d$ of the axle brought against the ends of the wooden wedges at the inner end of the hub, as shown in Fig. 1.

To prevent rotary movement of the concentric pipes of the hub, set-screws $f$ are provided, which are tapped through the outer pipe of the hub and into the inner tube or pipe, as shown in Figs. 1 and 4.

The spokes H are set diagonally and are screw-threaded at their ends, one end screwed into the hub, the outer pipe thereof, and the other end screwed into the felly, each end being provided with a jam-nut $h$, as shown in Fig. 1. Any one of the spokes may be readily removed without disturbing any of the others.

The wedges may be made in sections or pieces, or in concentric circles, as preferred.

The inner pipe of the skein is provided with holes $k$, through which lubricant may pass to render the same self-lubricating.

A wheel thus constructed is light, durable, easily put together, and not liable to become defective through shrinkage of any of the parts.

What I claim as new is—

The combination, with the hub formed of two concentric pipes with wooden wedges between them, of the axle-skein and axle formed with a flange inserted in the inner pipe of the hub, with the flange bearing against the end of the inner pipe and wedges, and a nut on the other end of the skein, substantially as shown and described.

In testimony that I claim the above I have hereunto subscribed my name in the presence of two witnesses.

PETER DENNAU, SR.

Witnesses:
 W. E. OSMUN,
 W. F. HANSON.